April 11, 1950  D. W. FATH  2,503,812
LIMIT SWITCH
Filed Aug. 31, 1945

Inventor
Douglas W. Fath
By [signature]
Attorney

Patented Apr. 11, 1950

2,503,812

UNITED STATES PATENT OFFICE 2,503,812

LIMIT SWITCH

Douglas W. Fath, Milwaukee, Wis., assignor to Cutler-Hammer, Inc., Milwaukee, Wis., a corporation of Delaware Application August 31, 1945, Serial No. 613,925

8 Claims. (Cl. 318—466)

The invention relates to a system for controlling a periodic supply of energy to a translating device and while not limited thereto is particularly adapted to the control of the movement of traveling devices which must be arrested in one or more given positions.

An object of the invention is to provide means for interrupting current supply to a translating circuit in response to movement into a given position of an element actuated as a function of energization of said translating circuit.

Another object is to provide a system of the character aforementioned wherein upon interruption of energy supply to a circuit such circuit cannot be reenergized during a predetermined temporary period.

Another object is to provide a system of the aforesaid character suitable for control of a motor-driven traveling device, and particularly for stoppage of the device upon its arrival at a certain position.

Another object is to provide in a conveying system means for effecting commutation of an electric circuit for a temporary period in response to the position of an element of said system.

Other objects and advantages of the invention will hereinafter appear.

The accompanying drawing is illustrative of an embodiment of the invention.

Figure 1:
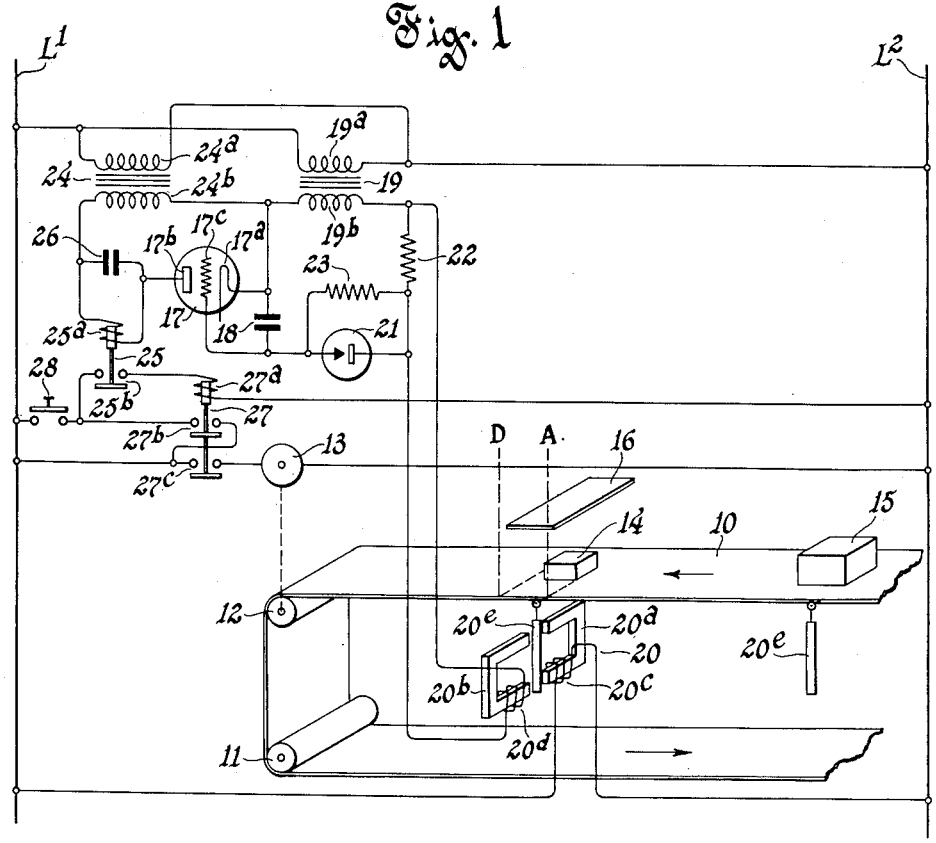
Figure 1 illustrates diagrammatically a system in which a conveyor is started manually and thereafter stopped for temporary periods after having traveled to certain positions.

Referring to Fig. 1 of the accompanying drawing the same illustrate diagrammatically a motor-driven conveyor system which is to be controlled so as to stop the conveyor in certain definite positions. The conveyor comprises an endless belt 10 of suitable construction. Only that much of the belt and its cooperating mechanism is shown as is necessary for an understanding of the operation of the apparatus. The belt passes over a suitable number of pulleys, two of which (11 and 12) are shown. The pulley 12 is coupled to a driving motor 13. At some point (not shown) objects to be transported, such as boxes 14 and 15, are placed on the belt at regular spaced points. These objects are to be delivered to a point D, which is located adjacent to a receiving platform 16 to which the objects are to be transferred from the belt. To transfer the objects, the belt must be stopped. The belt and the connected machinery have considerable inertia to which is added the inertia of the objects carried by the belt, the latter varying depending upon their weight. The motor may be provided with a suitable electromagnetic brake (not shown). In order to stop the belt accurately at the point D it is necessary to deenergize the motor and apply the brake at a point A in advance of the stopping point. The distance between the points A and D should be as short as possible so that the slow-down period during which the belt is decelerated is not too much of the total operating time between deliveries at the point D, while the belt approaches the point A at full speed.

Conventional limit switches for actuating the control of the motor require mechanical contact between parts at high relative speeds and are therefore subject to impacts which are destructive. Inductive devices used heretofore do not have this disadvantage but the controlling impulse which they afford is of too short duration for the reliable response of electromagnetic circuits controlled by the limit device and in most cases the magnitude of the impulse varies greatly with speed. The present invention overcomes these disadvantages as will be apparent from the following description of its operation. The system comprises an electron tube 17, having a cathode 17$^a$, an anode 17$^b$, and a control electrode 17$^c$. The characteristics of the tube are such that it is conducting when the potential of the control electrode with respect to the cathode is zero and that it is non-conducting when the potential of the control electrode becomes negative. Connected between the cathode 17$^a$ and the control electrode 17$^c$ is a condenser 18. Connected across the bus bars L$^1$, L$^2$ is the primary winding 19$^a$ of a potential transformer 19, which has a secondary winding 19$^b$; and the primary winding 20$^c$ of a transformer type limit device 20. The transformer 20 has a magnetic circuit comprising two U-shaped cores 20$^a$ and 20$^b$ which are mounted so that the ends of the respective legs face each other with an air gap interposed therebetween. The primary winding 20$^c$ is mounted on one leg of the core 20$^a$, while a secondary winding 20$^d$ is mounted coaxial with the winding 20$^c$ on the corresponding leg of the core 20$^b$. Shunting cores 20$^e$ are mounted on the conveyor adjacent to the points at which the loads 14 and 15 are placed on the belt 10, so as to move between the opposing poles of the cores 20$^a$ and 20$^b$, thereby shunting at least part of the magnetic flux in the core 20$^a$ around the core 20$^b$ and from winding 20$^d$, thus reducing the mutual inductance between the windings 20$^c$ and 20$^d$ and reducing the voltage induced in the winding $20^d$ substantially to zero. The secondary windings $19^b$ and $20^d$ of transformers 19 and 20, respectively, are so proportioned and are connected in series so that the voltage induced in the winding $19^b$ is equal but opposed to the voltage induced in the winding $20^d$. The series connected two windings are connected in series with a half-wave rectifier 21 across the terminals of the condenser 18, with the rectifier nearest to that terminal of the condenser 18, which is connected to the control electrode $17^c$. The winding $20^d$ is shunted by a resistor 22 and the rectifier 21 may also be shunted by a discharge resistor 23 of very high resistance value The tube 17 is supplied with energy from the secondary winding $24^b$ of a transformer 24, whose primary winding $24^a$ is connected across the bus bars $L^1$, $L^2$. One terminal of the secondary winding $24^b$ is connected to the cathode $17^a$, while the other terminal of winding $24^b$ is connected to the anode $17^b$ in series with the energizing winding $25^a$ of an electromagnetic relay 25. Connected in parallel with the winding $25^a$ is a smoothing condenser 26. The normally disengaged contacts $25^b$ of relay 25 form a part of the control of the energizing winding $27^a$ of an electromagnetic relay 27, which has normally open contacts $27^b$ and $27^c$. A normally open push button switch 28 is interposed between the line $L^1$ and one terminal of the contacts $25^b$, while the second terminal of the contacts $25^b$ is connected to one terminal of the winding $27^a$, the other terminal of which is connected to the line $L^2$. A circuit also extends from the connection between the contacts $25^b$ and the push button switch 28, through the contacts $27^b$ to bus bar $L^1$, so that contacts $27^b$ parallel the contacts of the push button switch 28. Motor 13 to be controlled by the system described is shown as adapted to be connected across bus bars $L^1$, $L^2$ by the contacts $27^c$.

The system operates in the following manner. With the bus bars $L^1$, $L^2$ energized, the primary windings $19^a$, $20^c$ and $24^a$ are also energized. This induces voltages in the secondary windings $19^b$, $20^d$ and $24^b$. Inasmuch as the sum of the voltages $19^b$ and $20^d$ is normally zero, no voltage is impressed on the condenser 18 and the potential of the grid $17^c$ is that of the cathode $17^a$. The tube 17 is therefore conducting, so that a current flows through the winding $24^b$ which energizes the winding $25^a$ and closes the contacts $25^b$. The condenser 26 smoothes out the ripples of half-wave rectified energizing current of the winding $25^a$.

If it is now desired to start the conveyor the push button switch 28 is operated. This establishes a circuit from line $L^1$, through contacts of push button 28, through contacts $25^b$ and the winding $27^a$, to line $L^2$, and the relay 27 is energized, thereby closing the contacts $27^c$, which completes a circuit from line $L^1$ through contact $27^c$, the motor 13, to line $L^2$, and the motor begins to rotate moving the conveyor 10 and the objects 14 and 15 forward. The contacts $27^b$ also close thereby completing a maintaining circuit from bus bar $L^1$, through contacts $27^b$ and $25^b$, through the energizing winding $27^a$ to bus bar $L^2$ thereby paralleling the contacts 28. The push button switch 28 may therefore be released and the relay 27 will remain energized and the motor will continue to operate. As soon as the conveyor has moved to a certain position, one of the cores $20^e$ moves into the air gap between the cores $20^a$ and $20^b$, thereby reducing the voltage induced in the coil $20^d$ to zero. Thus the coil $19^b$ impresses a potential upon the condenser 18 and control electrode $17^c$ which is negative with respect to the cathode $17^a$ during the half-cycles when the winding $24^b$ impresses a potential on the anode $17^b$ which is positive with respect to the cathode $17^a$. This negative potential on the control electrode $17^c$ renders the tube 17 non-conducting and charges the condenser 18 substantially instantly, the rate of charge being only limited by the relatively low forward resistance of rectifier 21. The condenser 18 is thus charged to a given potential which is independent of the speed of the conveyor. The potential of the condenser 18 maintains the tube 17 non-conducting after the aforementioned core $20^e$ has traveled beyond the air gap. The energizing coil $25^a$ is deenergized to open the contacts $25^b$ and stop the motor 13. The cycle of operation may be repeated by again actuating the push button switch 28. The blocking of the tube 17 is maintained and prevents reenergization of relay 25 and of the motor, even though the push button 28 is held depressed, until the condenser 18 is again discharged. The condenser 18 insures a sufficiently long period of deenergization of relay 25 to insure stoppage of the motor, even though the speed of passage of the core $20^e$ through the transformer slot is so rapid that the impulse voltage in the winding $20^d$ is of a duration shorter than the response time of relays 25 and 27.

To permit the condenser 18 to discharge during the subsequent period, that is, when the relay 25 is deenergized, the aforementioned high resistance 23 may be connected across the terminals of the rectifier 21 which permits discharge current to flow through said resistor, the resistor 22 and the winding $20^d$ in parallel, and the winding $19^b$. In some cases the discharge resistor 23 is not necessary as the slight conduction for reverse current of the rectifier 21 may be sufficient to discharge the condenser 18, particularly when the intervals between successive periods of energization of the relay 25 are relatively long.

The resistor 22 provides a connection between the winding $19^b$ and the rectifier 21. In case of an open circuit or short circuit in the windings $20^c$ or $20^d$ or in the wires leading to the limit device 20, the negative potential of winding $19^b$ will be impressed upon the control electrode $17^c$ by passing through rectifier 21. This will render the tube 17 non-conducting and will deenergize relay coil $25^a$, which will open contacts $25^b$ and stop the motor 13.

Figure 2:
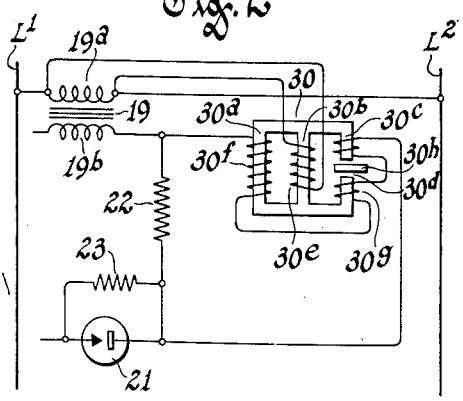
Figs. 2 and 3 are modifications of certain elements of the system illustrated in Fig. 1.

In the modification shown in Fig. 2, the transformer 20 of Fig. 1 and its windings are replaced by a transformer 30. The transformer 30 has a magnetic core comprising three parallel legs $30^a$, $30^b$ and $30^c$. An air gap $30^d$ is interposed in the third leg $30^c$. The respective ends of the three legs are connected by yokes in such a manner that the legs $30^a$ and $30^b$ form with the respective yokes a closed iron circuit, while the legs $30^b$ and $30^c$ form with the respective yoke a magnetic circuit having the air gap $30^d$ disposed therein. A primary winding $30^e$ is mounted on the center leg $30^b$ and connected across the bus bars $L^1$ and $L^2$. A secondary winding $30^f$ is mounted on the leg $30^a$ and a secondary winding $30^g$ comprising two parts connected in series and located at opposite ends of the air gap $30^d$ is mounted on the leg $30^c$. A magnetic core $30^h$ or a plurality of such magnetic cores are mounted on the machine to take the place of the magnetic cores $20^e$ in Fig. 1. The windings $30^f$ and $30^g$ are connected in series with each other across the resistor 22 in such a manner that when the core 30ʰ is interposed in the air gap 30ᵈ, the resultant of the voltage induced in these windings is of such magnitude and direction as to reduce the effective voltage on the control electrode 17ᶜ to a value which renders the tube 17 conducting. However, when the core 30ʰ enters the air gap 30ᵈ, the voltage induced in the coil 30ᵍ is increased, while the voltage in the coil 30ᶠ is decreased as the larger part of the flux induced in the primary core 30ᵇ now passes through the leg 30ᶜ, while the flux which passes through the leg 30ᵃ is reduced so that the resultant of the voltage of the windings 30ᶠ and 30ᵍ is of such magnitude and direction with respect to the voltage of the winding 19ᵇ as to reduce the potential on the control electrode 17ᶜ sufficiently to render the tube 17 non-conducting. Hence the cycle of operation of the system in accordance with the modification of Fig. 2 is the same as that aforedescribed in connection with Fig. 1.

Figure 3:
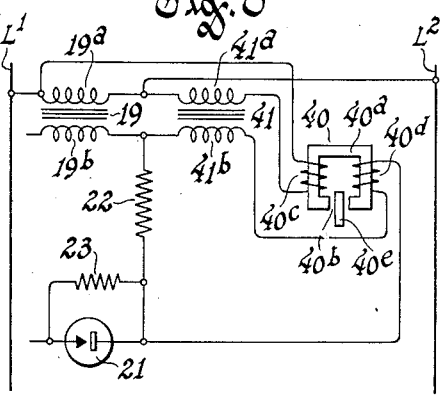

Fig. 3 shows still another modification of the system. In this case the transformer 40 is substituted for the transformer 20 in Fig. 1. The transformer 40 comprises a rectangular magnetic circuit 40ᵃ having an air gap 40ᵇ. A primary winding 40ᶜ is mounted on one leg of the core. A secondary winding 40ᵈ is mounted on the other parallel leg of the core. The air gap may be substantially short circuited by movable cores 40ᵉ, which take the place of cores 20ᵉ in Fig. 1. The primary winding 40ᶜ is connected in series with the primary winding 41ᵃ of a transformer 41 across the lines L¹, L². The transformer 41 also has a secondary winding 41ᵇ, which is connected in series with the winding 40ᵈ across the resistor 22. The voltages normally induced in the windings 41ᵇ and 40ᵈ are of such polarity that their resultant is in opposition to the voltage of the winding 19ᵇ, so that the potential impressed upon the control electrode 17ᶜ renders the tube 17 conducting. However, when the air gap 40ᵇ is reduced upon the core 40ᵉ entering it, the voltage induced in the winding 40ᵈ is increased. This also causes an increase of the voltage drop in the winding 40ᶜ with a resulting decrease of the voltage in the primary winding 41ᵃ. This decrease of the primary voltage in winding 41ᵃ decreases the voltage in the secondary winding 41ᵇ. The result of the decrease of the voltage in winding 41ᵇ and the increase of the voltage in winding 40ᵈ is an increase of the total voltage opposing the voltage of the winding 19ᵇ, the increase being of such magnitude as to in turn vary the potential of the control electrode 17ᶜ to a value which renders the tube 17 non-conducting and to effect operation of the system as described in connection with Fig. 1.

While the operation of the system has been described in connection with a belt or similar conveyor, the same is obviously applicable to other uses. The device to be operated on might be, for instance, a metal billet which is moved by a conveyor and which is to be cut to a certain length by conventional shears. In this case the billet itself could function as the core 20ᵉ of Fig. 1, or 30ʰ or 40ᵉ in Figs. 2 and 3, respectively, so that upon its entering the respective air gap the controller would actuate a translating device such as a motor or electromagnet which causes the shear to function to cut the billet to the desired length, as determined by the position of the transformer relative to the path of the billet.

The system shown in Fig. 1 may also be used for operation with billets, tubes, or rods, which are of non-magnetic material. In that case the eddy currents induced in the billet or the like by the primary winding 20ᶜ, deflect the primary flux from the secondary core of the transformer 20. Similar modifications are possible in connection with the transformers 30 and 40 of Figs. 2 and 3, respectively, except that in the latter cases the direction of winding the various secondary coils affected would have to be modified to produce the desired polarity of the respective voltages.

Instead of starting and stopping the motor 13 by the action of the electromagnetic switch 27 in Fig. 1, it would also be possible to use a continuously running motor which cooperates with the traveling device through an electromagnetic clutch controlled by the electromagnetic switch 27.

It is furthermore possible to employ hydraulic driving means and control the energy supplied to such driving means through an electromagnetic valve taking the place of or being controlled by the electromagnetic switch 27. Other modifications will be apparent to those skilled in the art.

I claim:

1. The combination with an electromagnetic device and a control element to direct changes in the electromagnet condition of said device, of means comprising an electron tube, responsive to said element to effect a given change in condition of said device and remaining effective for a given minimum period despite movement of said element for directing a further change in condition of said device, said tube having in a controlling circuit for said device an anode and a cathode and also having a control electrode, and said means also comprising a capacitor connected to said electrode and said cathode and having a leakage path and a variable supply of electrical energy for said capacitor under the control of said control element which element in directing said given change in condition of said device effects charging of said capacitor and which when moved to direct a further change permits discharge of said capacitor through said leakage path.

2. The combination with an electromagnetic device and a control element to direct demagnetization of said device, of means comprising an electron tube responsive to said element to effect the directed demagnetization of said device and remaining effective for a given minimum period despite movement of said element for directing magnetization of said device, said tube having an anode and a cathode in an energizing circuit for said device and also having a control electrode, and said means also comprising a capacitor connected to said control electrode and said cathode and having a leakage path and a variable supply of electrical energy for said capacitor under the control of said control element, which element in directing demagnetization of said device effects charging of said capacitor thus to render said tube non-conducting and which when operated to direct magnetization of said device permits discharge of said capacitor through said leakage path thus to render said tube again conducting subject to a given delay.

3. The combination with an electromagnetic device and a control element to direct changes in the electromagnetic condition of said device, of means comprising an electron tube, responsive to said element to effect a given change in condition of said device and remaining effective for a given minimum period despite movement of said element for directing a further change in condition of said device, said tube having in a controlling circuit for said device an anode and a cathode and also having a control electrode, and said means also comprising a capacitor connected to said electrode and said cathode and having a leakage path and a source of energy for said capacitor variable by said control element which element in directing said given change in condition of said electromagnetic device effects charging of said capacitor for non-conducting conditioning of said tube and which when moved to direct a further change permits said capacitor to discharge through said leakage path, said control electrode having a connection with said source of energy independent of said control element to subject said electrode to a potential for non-conducting conditioning of said tube but only when said control element due to circuit disorder loses control of said source.

4. The combination with an electromagnetic device and a control element to direct changes in the electromagnetic condition of said device, of means comprising an electron tube, responsive to said element to effect a given change in condition of said device and remaining effective for a given minimum period despite movement of said element for directing a further change in condition of said device, said tube having in a controlling circuit for said device an anode and a cathode and also having a control electrode, and said means also comprising a capacitor connected to said electrode and said cathode and having a leakage path, a source of energy for said capacitor, means to vary the energy supplied to said capacitor from said source which means comprises mutually inductive transformer windings, one having connections with said capacitor, another having given excitation and the mutual inductance thereof being controllable by said control element which when directing said given condition of said electromagnetic device effecting charge of said capacitor for given condition of said tube and which when directing a further change permits discharge of said capacitor for changing the conditioning of said tube subject to a given delay.

5. The combination with an electromagnetic device and a control element to direct changes in the electromagnetic condition of said device, of means comprising an electron tube, responsive to said element to effect a given change in condition of said device and remaining effective for a given minimum period despite movement of said element for directing a further change in condition of said device, said tube having in a controlling circuit for said device an anode and a cathode and also having a control electrode, and said means also comprising a capacitor connected to said electrode and said cathode, an alternating current source, a rectifying circuit for said capacitor extending across said source and including a resistor, and mutually inductive windings whose mutual inductance is variable by said control element, one of said windings being connected across said resistor and another being subjected to given excitation.

6. The combination with an electric motor, electromagnetic control means for said motor and a control element for said electromagnetic means driven by said motor and directing changes in the electromagnetic condition of said means for different controlling effects on said motor, said element according to its speed being apt upon directing one change to direct a further change sooner than said change is desired, of means comprising an electron tube to control said changes under direction of said element but insuring a given minimum duration of a given change despite movement of said element to direct a further change, said tube having in a controlling circuit for said electromagnetic means an anode and a cathode and also having a control electrode, and the second mentioned means comprising in addition to said tube a capacitor connected between said control electrode and said cathode provided with a leakage path, and a variable supply of electrical energy for said capacitor under the control of said motor driven element which element in directing said given change in condition of said electromagnetic means effects charging of said capacitor and which when moved to direct a further change permits discharge of said capacitor through said leakage path.

7. The combination with an electromagnetic device and a control element to direct changes in the electromagnetic condition of said device, of means comprising an electron tube, responsive to said element to effect a given change in condition of said device and remaining effective for a given minimum period despite movement of said element for directing a further change in condition of said device, said tube having in a controlling circuit for said device an anode and a cathode and also having a control electrode, and said means also comprising a capacitor connected to said electrode and said cathode, an alternating current source, a rectifying circuit for said capacitor extending across said source and including a resistor, and mutually inductive windings whose mutual inductance is variable by said control element, one of said windings being connected across said resistor and another being subjected to given excitation, said control electrode having a connection with the source of said energy supply independent of said control element which connection subjects said electrode to a potential for non-conducting conditioning of said tube but only when said control element due to circuit disorder loses control over said energy supply.

8. The combination with an electromagnetic device and a control element to direct changes in the electromagnetic condition of said device, of means comprising an electron tube, responsive to said element to effect a given change in condition of said device and remaining effective for a given minimum period despite movement of said element for directing a further change in condition of said device, said tube having in a controlling circuit for said device an anode and a cathode and also having a control electrode, and said means also comprising a capacitor connected to said electrode and said cathode, an alternating current source, a rectifying circuit for said capacitor extending across said source and including a resistor, and mutually inductive windings whose mutual inductance is variable by said control element, one of said windings being connected across said resistor and another being subjected to given excitation, said given change in condition of said electromagnetic means being deenergization thereof for stopping of said motor and said electromagnetic means having an associated manual control which requires a given manual setting for starting and for each restart of said motor.

DOUGLAS W. FATH.

(References on following page)

REFERENCES CITED

The following references are of record in the file of this patent:

UNITED STATES PATENTS

| Number | Name | Date |
|---|---|---|
| 1,948,685 | Stevens | Feb. 27, 1935 |
| 2,189,193 | Brown | Feb. 6, 1940 |
| 2,217,476 | Gulliksen | Oct. 8, 1940 |
| 2,255,526 | Lassen | Sept. 9, 1941 |
| 2,287,926 | Zepler | June 30, 1942 |
| 2,289,322 | Collom | July 7, 1942 |